United States Patent [19]
Ayrton

[11] Patent Number: 5,741,456
[45] Date of Patent: Apr. 21, 1998

[54] CARBON FIBRE PANELS WITH LASER FORMED HOLES

[75] Inventor: Glen Donald Ayrton, North Yorks, England

[73] Assignee: Hurel DuBois UK Limited, Burnley, United Kingdom

[21] Appl. No.: 491,859

[22] PCT Filed: Jan. 13, 1994

[86] PCT No.: PCT/GB94/00077

§ 371 Date: Sep. 21, 1995

§ 102(e) Date: Sep. 21, 1995

[87] PCT Pub. No.: WO94/15746

PCT Pub. Date: Jul. 21, 1994

[30] Foreign Application Priority Data

Jan. 13, 1993 [GB] United Kingdom ................ 9300545

[51] Int. Cl.[6] .................................................. B23K 26/00
[52] U.S. Cl. .................... 264/400; 428/137; 428/131; 428/113; 428/107; 428/109; 428/114; 219/121.7; 219/121.71; 219/121.72; 181/292
[58] Field of Search ............................... 428/137, 131, 428/113, 107, 109, 114; 219/121.7, 121.71, 121.72; 181/292; 264/400

[56] References Cited

U.S. PATENT DOCUMENTS

| | | | |
|---|---|---|---|
| 4,341,826 | 7/1982 | Prewo et al. | 428/35 |
| 4,612,737 | 9/1986 | Adee et al. | 51/310 |
| 4,741,943 | 5/1988 | Hunt | 428/113 |
| 4,915,981 | 4/1990 | Traskos et al. | 427/53.1 |
| 4,992,025 | 2/1991 | Stroud et al. | 416/97 R |
| 5,073,687 | 12/1991 | Inagawa et al. | 219/121.7 |
| 5,500,505 | 3/1996 | Jones | 219/121.67 |

OTHER PUBLICATIONS

Butje, "Optimal mit Angepassten Strahlgoellen und Prozessparamevern", Technische Rundschare, No. 31, Aug. 1991 Bern, CH pp. 32-38.

*Primary Examiner*—William Watkins
*Attorney, Agent, or Firm*—Bacon & Thomas

[57] ABSTRACT

A layer 1 is formed from carbon fibre strands that are pre-impregnated with epoxy resin to hold the fibers together. The strands of carbon fiber that make up the layer 1 comprise eight uni-directional sub layers that are assembled with their strands extending at different angles to each other. The assembled sub-layers that are impregnated with epoxy resin are then baked under pressure in an autoclave to form a composite layer 1. A laser is then used to burn through the layer to make the holes 2.

8 Claims, 1 Drawing Sheet

CARBON FIBRE PANELS WITH LASER FORMED HOLES

BACKGROUND OF THE INVENTION

The present invention relates to aircraft carbon fibre panels, a method of making aircraft carbon fibre panels, an aircraft incorporating a carbon fibre panel and a method of using an aircraft carbon fibre panel.

U.S. Pat. No. 4,612,737 (Rohr) discloses a method of making an aircraft carbon/carbon panel in which holes are drilled in the panel. Rohr also states that laser drilling was tried but was undesirable.

SUMMARY OF THE INVENTION

According to one aspect of the present invention a method of making an aircraft carbon fibre panel which includes permeable openings therethrough comprising forming a layer having a first and second side, the layer including a plurality of fibres and epoxy resin and subjecting the layer to heat and pressure is characterised in that the openings are subsequently burnt through the panel from the first side to the second side with a laser and in that the region of the layer adjacent to the second side is formed with substantially unidirectionally extending fibres.

The method may comprise forming the region adjacent to the second side with substantially unidirectionally extending fibres.

The method may comprise forming more than one, or forming all regions of the layer with substantially unidirectional fibres. Adjacent regions of substantially unidirectionally extending fibres may extend in different directions. The method may comprise forming the panel by arranging for adjacent regions of unidirectionally extending fibres to extend at different angles to each other, for example at 0°,90°,45° and 135° with respect to each other or at 0°,90°, 45°,135°,135°,45°,90° and 0° relative to each other.

The method may comprise forming the panel as a substantially flat panel. Alternatively the method may comprise forming at least a part of the panel as a curved panel which may include a double curvature. Alternatively the method may comprise forming the panel as a tubular panel.

The present invention also includes an aircraft carbon fibre panel including a plurality of permeable openings therethrough characterised in that the openings have been formed by burning through the layer from a first side to a second side with a laser and in that the region of the layer adjacent to the second side has substantially unidirectionally extending fibres.

The cross sectional area of the openings may be less than 32k, 8k, 5k or in the region of 2k microns$^2$. The openings may be substantially circular in cross section. One side of the panel at least may include substantially unidirectionally extending fibres. The layer may include more than one region including, or all regions of the layer may include, substantially unidirectional fibres. Adjacent regions within the layer having unidirectional fibres may have different extents for the unidirectional fibres. The layer may include adjacent regions going across the layer having unidirectional fibres extending at 0°,90°,45°, and 135° to each other or at 0°,90°,45°,135°,135°,45°,90° and 0° to each other.

The panel may comprise a substantially flat panel. Alternatively the panel may include at least a part which is curved or which includes a double curvature and the panel may comprise a substantially tubular panel.

The present invention also incorporates an aircraft carbon fibre panel as herein referred to or an aircraft carbon fibre panel which has been made by a method as herein referred to.

The present invention also includes a method of using an aircraft carbon fibre panel as herein referred to or the method of using an aircraft carbon fibre panel which has been made by a method as herein referred to comprising allowing fluid (such as air) to be located within the openings, and may comprise pressure in the fluid passing from one side to the other and may further comprise fluid flowing through the openings.

The present invention includes any combination of the herein referred to features and limitations.

BRIEF DESCRIPTION OF THE DRAWINGS

The present invention may be carried into practice in various ways but one embodiment will now be described by way of example and with reference to the accompanying drawing, in which.

DESCRIPTION OF THE PREFERRED EMBODIMENT(S)

Before discussing the specific embodiments in detail, the reason for producing perforated carbon fibre panels will be explained.

It is desired to ensure that the airflow over the surface of an aircraft remain laminar and towards that end the skin of the aircraft is made smooth. That smoothness also reduces noise from the air flowing over the skin. It is also desired to keep the weight of the skin down to reduce the weight of the aircraft. The smooth flow of air and the reduced weight both act to reduce the fuel consumption and therefore increase the payload of the craft and increase the distance which can be covered for a given capacity of fuel.

It is further desired to try and ensure that the air flow in the boundary layer remains laminar such that transition to turbulent flow is delayed, over the surface of an aircraft; a laminar boundary layer offers significantly less friction drag than a turbulent one, and friction drag contributes a major proportion of total aircraft drag.

In order to assist in maintaining the streamlines evenly over the surface it is proposed to perforate the skin of the aircraft at at least some locations and to exert either a negative pressure from within the skin to urge the streamlines towards the skins or to exert a positive pressure from within the skin. The pressures can be adjusted if desired in dependence upon the speed or flying conditions of the aircraft. In acoustic applications, there may be no net flow of fluid through the openings and only a pressure impulse may be transmitted through the opening.

Figure 1:
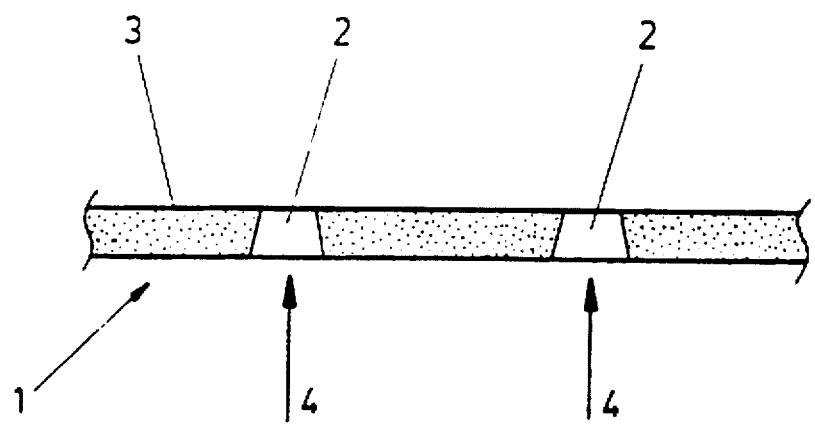
FIG. 1 is a schematic enlarged cross section through a layer 1 including laser drilled holes 2.
Figure 2:
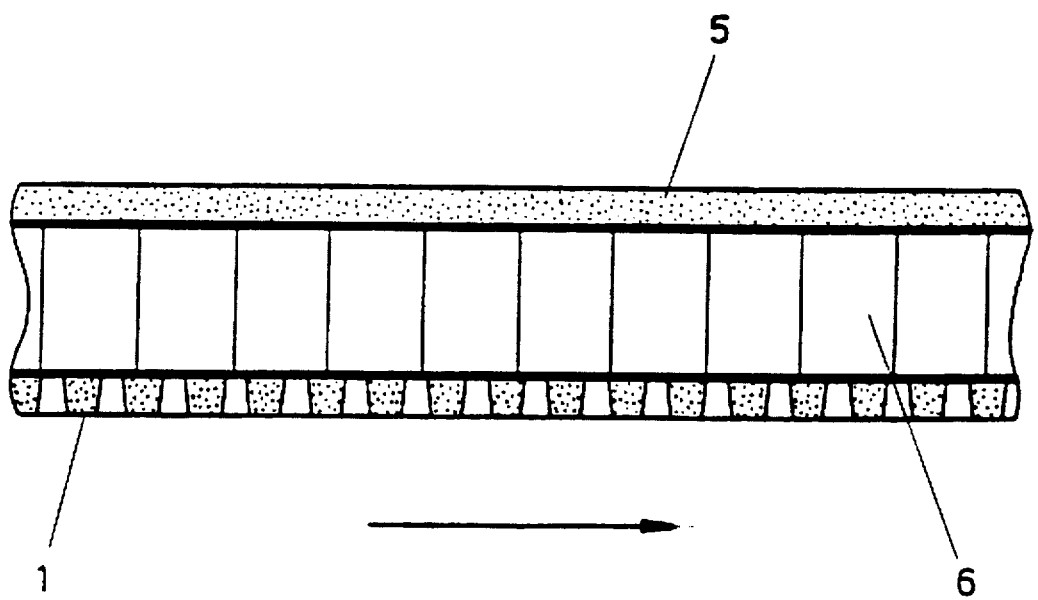
FIG. 2 is a schematic cross section of an aircraft panel incorporating the laser drilled layer 1.

It is proposed to form a carbon fibre layer approximately 1 mm thick containing epoxy resin; to bake that layer in an autoclave and then to burn holes through that layer to enable the air to be blow or sucked through those holes. The carbon fibre filaments have a cross sectional area of approximately 50 micron$^2$. As shown in FIG. 1, the carbon fibre and epoxy resin layer 1 has had a number of holes 2 of approximately 50 microns diameter (on the outer surface 3) drilled therethrough. The holes are in a grid formation in which rows of holes are drilled with adjacent holes in a row being spaced from each other by between 0.1 to 2 mm and with the holes in adjacent rows being offset from each other by between 0.1 to 2.

The layer 1 is formed from carbon fibre strands which are formed into sub layers and laid on top of each other. Before being laid on top of each other each sub layer is pre-impregnated with epoxy resin which holds the fibres together. The layer is then baked at high temperature and under pressure in an autoclave to produce a layer having a thickness of 1 mm. The resultant layer is then perforated to create the holes 2 by directing a laser at the layer from the direction of the arrows 4 to burn the holes through. The layers taper inwardly from the inside to the outer surface 3 as a result of the action of the laser. It has been found that the region of the outer surface where the laser bursts through remains extremely smooth and does not blister, when this layer is built up as described below. Furthermore, these holes 2 are of relatively constant size and are consistently created (as opposed to the laser failing to penetrate) with the layer to be described.

The layer shown in FIG. 1 is built up from "unidirectional" sub layers. It is surprising that unidirectional layers work as these layers are prone to delamination upon drilling. Furthermore although the unidirectional layers have great strength in the direction of extent of the fibres, they are weak in the transverse direction and accordingly, they are not an obvious choice to use on the skin of an aircraft where the stress lines are extremely difficult to predict and indeed vary from one location to an adjacent location and vary at particular locations in dependence upon numerous optional conditions.

The layer 1 is made up of eight unidirectional sub layers. The sub layers are assembled with unidirectional strands in the adjacent sub layers extending at the following angle relative to each other: 0:90:45:135:135:45:90:0. In an alternative embodiment only four such sub layers may be incorporated with the warp strands extending at 0:90:45:135.

The assembled sub layers are then baked under pressure in an autoclave to form the composite layer 1. A laser is then used to burn through the layer to make the holes 2.

As the sub layers include unidirectional fibres, the strands of carbon fibre are able to contact each other and there is much less interstitial space than in a conventional weave having an even number of warp and weft threads. Accordingly, there is a lower density of resin in the unidirectional weave. As the resin is transparent it is thought that the relatively low amount of resin does not reflect and refract the laser than would be the case were there to be a great amount of resin and therefore the heat from the laser is concentrated to a greater extent at the area to be burnt. Accordingly the concentrated heat quickly and cleanly makes the hole without the layer being prone to delamination and bursting or blistering of the outer surface. Alternatively or additionally it is thought that as the internal portion of the layer and the outer surface of the laser are not disturbed by fibres extending across the layer and as the sub layers do not have a great proportion of epoxy resin, the sub layers and surface do not tend to delaminate or blister as would other layers having a greater proportion of resin to carbon fibre in which the differential between the coefficient of expansion of the fibres and resin would have more influence. Another possibility for the consistent clean holes is that the outer layer presents a substantially consistent outer surface of aligned fibres and that the chances are that the laser therefore meets a more consistent layer around the periphery of the holes as it cuts through than would be the case where warp and weft strands have equal numbers of fibres, in which case the laser may well burst through at junctions between the warp and weft strands.

Although the panel has been described in relation to the skin of the aircraft, in which case the panel may be planar or curved and may include a double curvature it will be appreciated that the panel could be used as a shroud for an engine, in which case the panel can be generally tubular in cross section.

Aircraft noise regulations restrict aircraft from operating above certain noise levels. In many aircraft some form of acoustic lining is necessary in the bypass duct of the powerplants to achieve these limits. The nacelle forms the bypass duct and is typically of sandwich construction, double or multiple skins separated by honeycomb cores 6. The noise absorbing properties may be enhanced by perforating the bypass wind swept surface 1 of the structure into the chambers created by the skin/honeycomb construction. The resulting attenuation properties tend to be much more effective at the design frequency and will be considerably less effective at higher or lower frequencies. As the noise generated by the powerplant varies due to load and other conditions, it is desirable to have relatively constant attenuation properties over a spectrum of frequencies. For fixed percentage porosity, the smaller the hole size, the more the attenuation properties approach this ideal.

The carbon fibre skin 5 and the layer 1 are bonded by the adhesive to the honeycomb 3.

I claim:

1. A method of making an aircraft carbon fibre panel which includes permeable openings (2) therethrough comprising forming a layer (1) having a first and second side (3), the layer including a plurality of fibres and epoxy resin, with at least the region of the layer adjacent to the second side being formed with substantially unidirectionally extending fibres (3); subjecting the layer to heat and pressure; and burning the openings (2) through the panel from the first side to the second side (3) with a laser.

2. A method as claimed in claim 1 comprising forming more than one of the regions of the layer (1) with substantially uni-directional fibres.

3. A method as claimed in claim 2 in which the fibres of adjacent regions of substantially uni-directional extending fibres extend in different directions.

4. A method as claimed in claim 3 comprising arranging the fibres of adjacent regions of uni-directionally extending fibres to extend at angles of 0°, 90°, 45° and 135° with respect to each other.

5. A method as claimed in claim 1 comprising forming the panel as a substantially flat panel.

6. A method as claimed in claim 1 comprising forming at least part of the panel as a curved panel.

7. A method as claimed in claim 6 comprising forming at least part of the panel to include a double curvature.

8. A method as claimed in claim 7 comprising forming the panel as a tubular panel.

* * * * *